United States Patent
Miyamura

(10) Patent No.: US 9,891,850 B2
(45) Date of Patent: Feb. 13, 2018

(54) METHOD FOR BACKING UP DATA ON TAPE

(71) Applicant: International Business Machines Corporation, Armonk, NY (US)

(72) Inventor: Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/102,857

(22) PCT Filed: Aug. 25, 2014

(86) PCT No.: PCT/JP2014/072097
§ 371 (c)(1),
(2) Date: Jun. 8, 2016

(87) PCT Pub. No.: WO2015/087584
PCT Pub. Date: Jun. 18, 2015

(65) Prior Publication Data
US 2016/0313933 A1   Oct. 27, 2016

(30) Foreign Application Priority Data

Dec. 11, 2013 (JP) .................................. 2013-256472

(51) Int. Cl.
*G11B 5/86* (2006.01)
*G06F 3/06* (2006.01)
*G06F 12/00* (2006.01)

(52) U.S. Cl.
CPC ............ *G06F 3/0619* (2013.01); *G06F 3/065* (2013.01); *G06F 3/0611* (2013.01);
(Continued)

(58) Field of Classification Search
CPC . G11B 2220/90; G11B 27/032; G11B 27/024; G11B 5/86; G11B 27/3027; G11B 2220/20; G11B 5/584; G11B 5/5508
(Continued)

(56) References Cited

U.S. PATENT DOCUMENTS 9,037,790 B2 * 5/2015 Jaquette ............... G11B 27/002
707/758
2012/0179867 A1 7/2012 Chakravarty et al.
(Continued)

FOREIGN PATENT DOCUMENTS

JP  2005275674 A  10/2005
JP  2013101506 A  5/2013
(Continued)

OTHER PUBLICATIONS

Hasegawa, T. et al., "A Method to Improve the Restoration of Files from Tape File Systems," IBM Professionals' Papers 4, Provision No. 72, Winter 2012, pp. 97-103.
(Continued)

*Primary Examiner* — Nabil Hindi
(74) *Attorney, Agent, or Firm* — Zilka-Kotab, P.C.

(57) ABSTRACT

A method for backing up data on a tape in a file system is provided. This method includes the steps of: copying the data area in the first data area, excluding the third data area, as well as in the second data area to the tape as a single, contiguous fourth area; copying the second data area to a position corresponding to the replacement of the third data area; storing index information for identifying the fourth data area to the tape; copying the third data area to the tape as a fifth data area separate from the fourth data area; and storing on the tape the index information for identifying the data area in the fourth data area excluding the second data area, and the index information for identifying the fifth data area.

16 Claims, 6 Drawing Sheets

(52) U.S. Cl.
CPC .......... *G06F 3/0643* (2013.01); *G06F 3/0682* (2013.01); *G06F 12/00* (2013.01)

(58) Field of Classification Search
USPC .................................. 360/13, 15, 48, 77.12
See application file for complete search history.

(56) References Cited

U.S. PATENT DOCUMENTS

| | | |
|---|---|---|
| 2012/0179868 A1 | 7/2012 | Haustein et al. |
| 2013/0132663 A1 | 5/2013 | Eleftheriou et al. |

FOREIGN PATENT DOCUMENTS

| | | |
|---|---|---|
| JP | 2013161185 A | 8/2013 |
| JP | 2013191259 A | 9/2013 |
| JP | 2013206518 A | 10/2013 |

OTHER PUBLICATIONS

International Search Report and Written Opion from International Application No. PCT/JP2014/072097, dated Nov. 18, 2014.
Miyamura, T., U.S. Appl. No. 15/807,442, filed Nov. 8, 2017.

\* cited by examiner

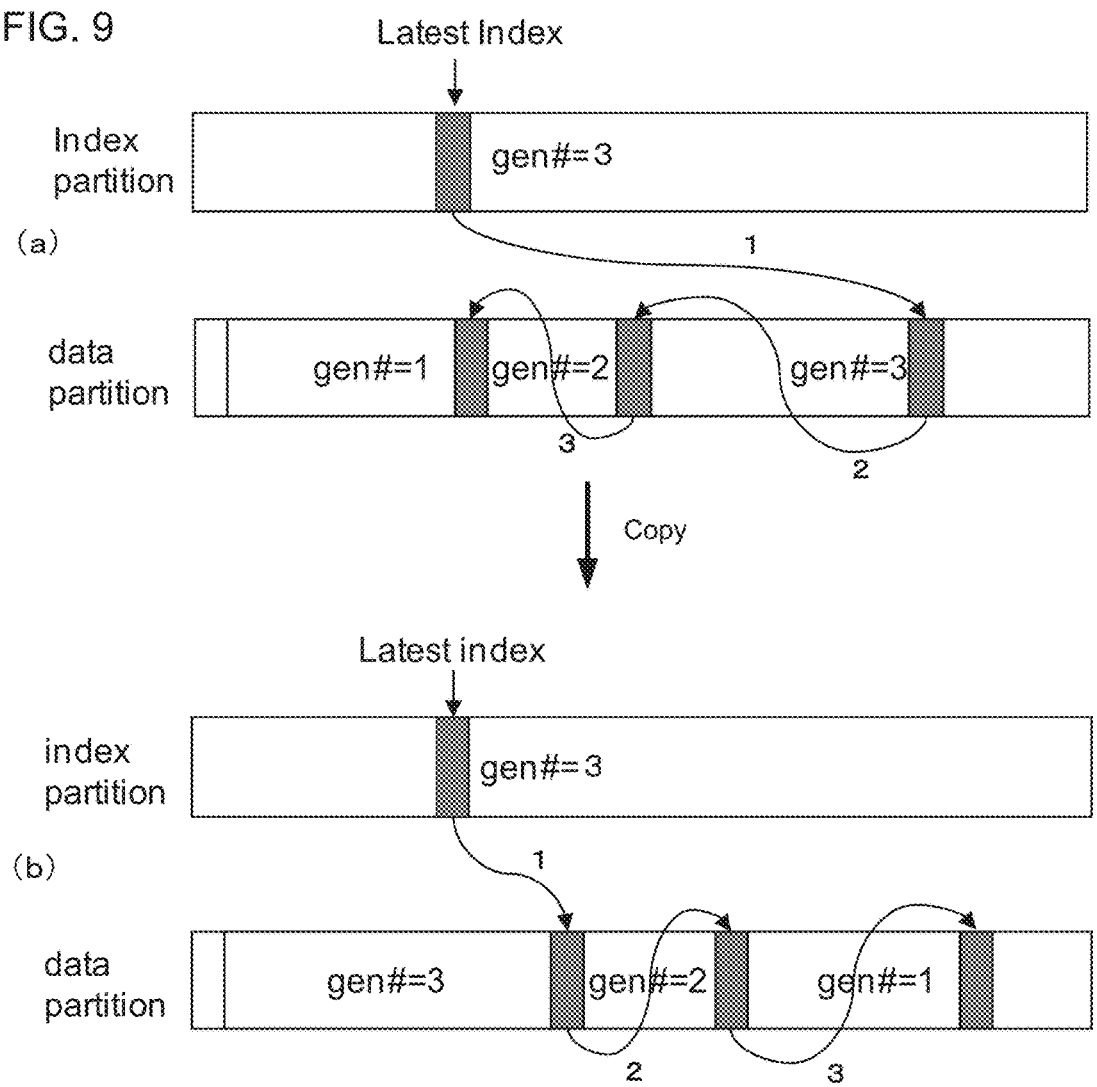

METHOD FOR BACKING UP DATA ON TAPE

TECHNICAL FIELD

The present invention relates to a file system including a tape drive and, more specifically, to a method for backing up data on tapes in a file system.

BACKGROUND ART

The Linear Tape File System (LTFS) format has been put to practical use as a mechanism for accessing data in tape drives as files in a file system. In the LTFS format, metadata such as where data areas constituting a file are located on a tape is associated in the form of an index to realize a file system.

Due to the nature of tape, the LTFS format is used when a file is edited as a mechanism for appending edited data instead of overwriting the previously written data. While this allows a previously written generation of file to be restored, it also takes time to read an edited file.

A similar problem occurs when the data configuration on a tape is backed up to another tape, and the backed up data (files) is read. The time required to read one of the edited files can be reduced by copying only the most recent generation of edited files to another tape, but this so-called logical copy does not allow previously written generations of the file to be restored.

CITED LITERATURE

Patent Literature

Patent Literature 1 Laid-open Patent Publication No. 2005-275674

SUMMARY OF INVENTION

Technical Problems

It is an object of the present invention to solve or mitigate the problem associated with the prior art by providing a backup method that is able to maintain the features of the file system such as retaining the state of the most recently written files while also retaining a history of data previously written to the tape when backing up the tape, and that is also able to eliminate or reduce the deterioration in performance that occurs when edited files are read from the tape.

Means of Solving the Problem

In one aspect of the present invention, a method for backing up data on a tape in a file system is provided. In this method, the data is stored on the tape as a single file including a first data area and a second data area separate from the first data area, the data in the second data area corresponds to data in a third data area, which is a changed portion of the data in the first data area, and each data area is managed using index information including the start positions of data on the tape and length information. This method includes the steps of: copying the data area in the first data, area excluding the third data area, as well as in the second data area to the tape as a single, contiguous fourth area; copying the second data area to a position corresponding to the replacement of the third data area; storing index information for identifying the fourth data area to the tape; copying the third data area to the tape as a fifth data area separate from the fourth data area; and storing on the tape the index information for identifying the data area in the fourth data area excluding the second data area, and the index information for identifying the fifth data area.

When data on a tape is backed up in this aspect of the present invention, a data area (a second data area) including data that has been changed in the data area constituting the single file, as well as the unchanged data area, are copied to the tape as a single, continuous data area so that the copied file can be read quickly at a later time. In addition, the index information corresponding to each of the data areas prior to the change (the fourth data area excluding the second data area, and the fifth data area) are copied to the tape so that the history of data written to the tape in the past can be retained and the past data can be read at a later time.

In another aspect of the present invention, a method for backing up data on a tape in a file system is provided. In this method, the data is stored on the tape as a single file including a first data area and a second data area separate from the first data area, the data in the second data area corresponds to data appended to the first data area, and each data area is managed using index information including the start positions of data on the tape and length information. This method includes the steps of: copying the first data area and the second data area to the tape as a continuous third data area; storing index information on the tape for identifying the third data area; and storing on the tape index information for identifying the data area in the third data area excluding the second data area.

When data on a tape is backed up in this aspect of the present invention, a data area (a second data area) including data appended to the data area (a first data area) constituting the single file are copied to the tape as a single, continuous data area (a third data area) so that the copied file can be read quickly. In addition, the index information corresponding to the data area prior to the addition (the third data area excluding the second data area) is also copied to the tape so that the history of data previously written to the tape can be retained and the previously written data can be read at a later time.

In another aspect of the present invention, a method for backing up data on a tape in a file system is provided. In this method, the data is stored on the tape as a single file including a first data area and a second data area separate from the first data area, the data in the second data area corresponds to all of the changed data in the first data area, and each data area is managed using index information including the start positions of data on the tape and length information. This method includes the steps of: copying the second data area on the tape as a third data area; storing on the tape index information for identifying the third data area; copying the first data area to the tape as a fourth data area separate from the third data area; and storing on the tape index information for identifying the fourth data area.

When data on a tape is backed up in this aspect of the present invention, a data area (a second data area) including the data area constituting the single file (a first data area) whose data has been changed in its entirety is copied to the tape as a single, continuous data area (a third data area) so that the copied file can be read quickly. In addition, the index information corresponding to the data area prior to the change (the fourth data area) is also copied to the tape so that the history of data previously written to the tape in the past can be retained and the previously written data can be read at a later time.

A system according to one embodiment includes a head configured to write data to a tape and a hardware controller coupled to the head. The controller is configured to perform one or more of the foregoing methods.

BRIEF EXPLANATION OF THE DRAWINGS

FIG. 9 is an image diagram of the backup of data with multiple generations in the present invention.

DETAILED DESCRIPTION

Figure 1:
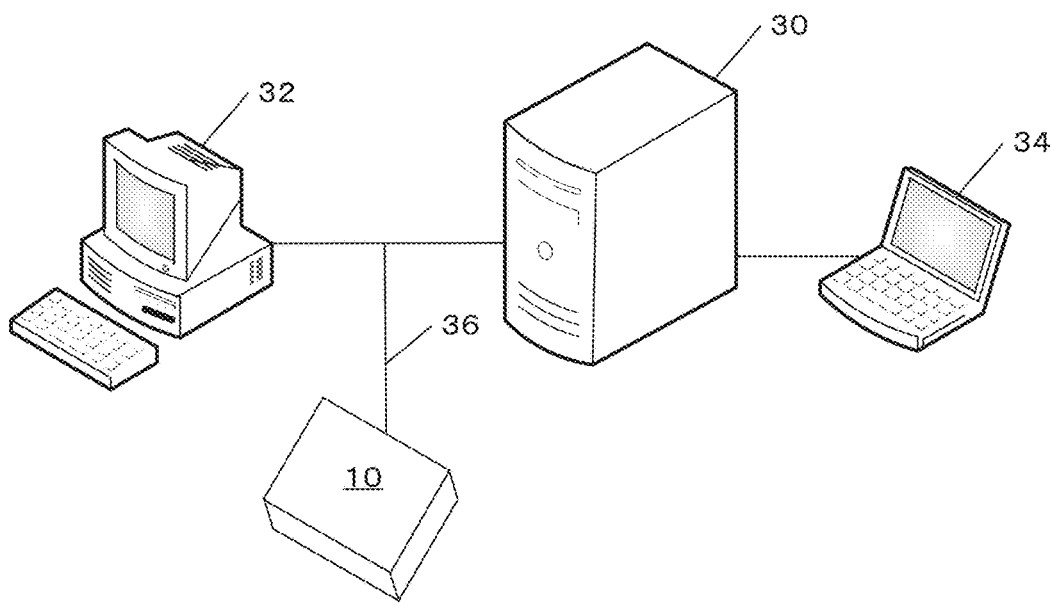
FIG. 1 is a diagram showing a configuration example of a file system of the present invention.

The following is an explanation of an embodiment of the present invention with reference to the drawings. In the following, the embodiment of the present invention is explained in comparison to the prior art where necessary. FIG. 1 is a diagram showing a configuration example of a file system in which the method of the present invention can be embodied. The file system 100 includes a tape drive 10, a host (server) 30, and PCs (terminals) 32, 34 able to communicate with each other via a network 36. Only one tape drive 10 and host (server) 30 have been rendered in FIG. 1, but this is merely an illustration. It may include two or more tape drives 10 and hosts (servers) 30.

The file system 100 can use the LTFS format. In the LTFS format, a tape cartridge is inserted into a tape drive and files stored on the tape cartridge are accessed directly in the same manner as other removable storage media such as HDD, USB memory, and CD-R media. In order to construct a file system in a tape drive, the tape drive requires partitions. These partitions are described below.

Figure 2:
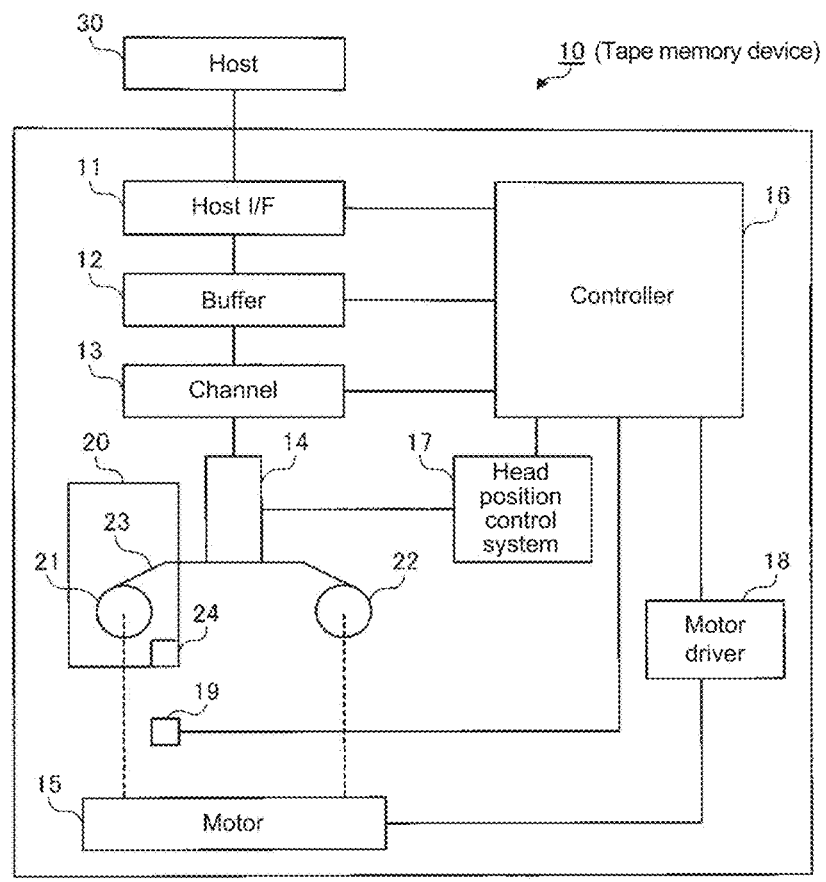
FIG. 2 is a diagram showing a configuration example of a tape drive of the present invention.

FIG. 2 is a diagram showing a configuration example of a tape drive of the present invention. The tape drive 10 includes a host interface (referred to as the host I/F below) 11, a buffer 12, a channel 13, a head 14, and a motor 15. It also includes a controller 16, a head position control system 17, and a motor driver 18. Because a tape cartridge 20 can be inserted and loaded into the tape drive 10, a tape cartridge 20 is also depicted here. The tape cartridge 20 includes a tape 23 wound around reels 21, 22. As the reels 21, 22 rotate, the tape 23 moves longitudinally in the direction from reel 21 to reel 22, or in the direction from reel 22 to reel 21. The tape 23 medium depicted here is magnetic tape, but it can be a tape medium other than magnetic tape.

The tape cartridge 20 also includes cartridge memory (CM) 24. The CM 24 records information such as how the data has been written on the tape 23. For example, data can be accessed more quickly by reading the usage status of the tape 23 such as the physical position information from the CM via a contactless RF Interface. In FIG. 2, the interface used to access the CM 24 such as an RF interface is referred to as the cartridge memory interface (CM I/F) 19.

Here, the host I/F 11 communicates with the host (server) 30 and other PCs 32. For example, it receives commands from the OS of the host 30 instructing the drive to write data to the tape 23, move the tape 23 to a specific position, and read data from the tape 23. In the example of the LTFS format described above, because the data in the tape drive can be referenced directly from a desktop OS, the files can be double-clicked like files on an HDD, and dragged and dropped to copy them.

The buffer 12 is one or more memory device used to store data to be written to the tape 23 and data read from the tape 23. This can be composed of DRAM. The buffer 12 has a plurality of buffer segments, and each buffer segment contains data sets which are units of data written to and read from the tape 23.

The channel 13 is a communication path used to send data to be written to the tape 23 to the head 14 and to receive data read from the tape 23 via the head 14. The head 14 writes information to the tape 23 and reads information from the tape 23 when the tape 23 is moved longitudinally. The motor 15 rotates the reels 21, 22. In FIG. 2, the motor 15 is represented by a single square. However, two motors 15 are preferably provided—one for each of the reels 21, 22.

The controller 16 controls the entire tape drive 10. For example, it controls the writing of data to the tape 23 and the reading of data from the tape 23 on the basis of commands received via the host I/F 11. It also controls the head position control system 17 and the motor driver 18. The head position control system 17 is the system used to track the desired wrap. Here, a wrap refers to a group of tracks on the tape 23. When the wrap has to be switched, the head 14 has to be switched electrically, and the switching control is performed by the head position control system 17.

The motor driver 18 drives the motor 15. When there are two motors 15, two motor drivers 18 are also provided. The CM I/F 19 is realized using an RF reader/writer, and is used to write information in the CM 24 and to read information from the CM 24.

Figure 3:
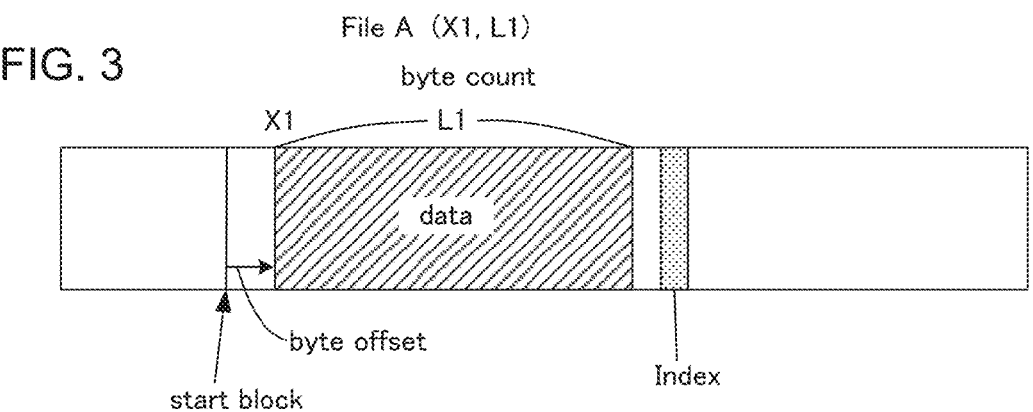
FIG. 3 is a diagram showing a configuration example of a data partition of the present invention.
Figure 4:
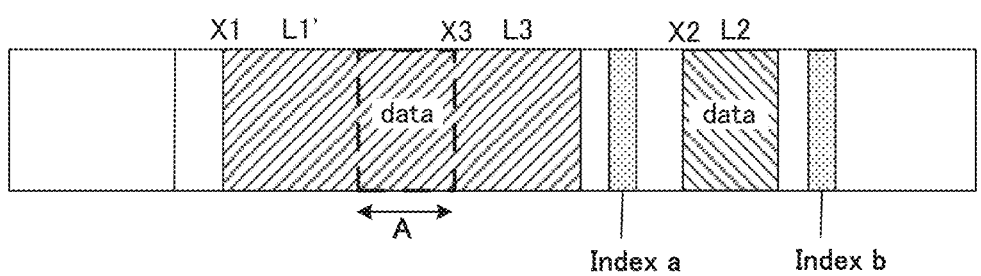
FIG. 4 is a diagram showing a configuration example of the data partition after some of the data in FIG. 4 has been edited.
Figure 5:
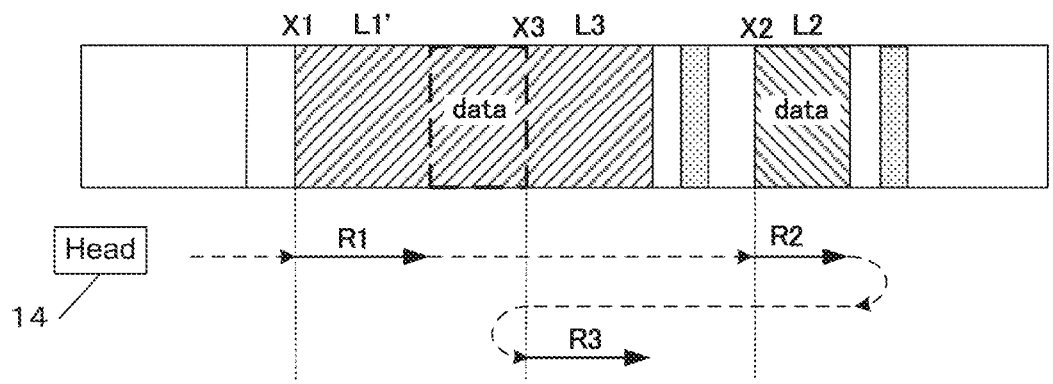
FIG. 5 is an image diagram of data reading (READ) in the configuration example shown in FIG. 4.

The following is an explanation of the configuration of the partitions and the index in the LTFS format used to embody the present invention with reference to FIG. 3 through FIG. 5. In the LTFS format, the tape uses logical delimiters referred to as partitions which have been supported since LTO5. There are two partitions: an index partition and a data partition. The data partition is composed of the data constituting the file and index information written after the file has been written and certain conditions have been met. The most recent index information is stored in the index partition, which is read when the cartridge is loaded into a tape drive in order to determine which files are written in which locations.

FIG. 3 is a diagram showing a configuration example of a data partition. In FIG. 3, File A is a single file including data and an associated index. The elements constituting the index information in the index include a partition ID, start block, byte offset, byte count and file offset. Together these are referred to as the "extent". The content of each element is described below. In the following explanation, the data constituting a single file is referred to simply as data or the data area. The information (a set of elements) included in the index is referred to as the index information or the extent.

(a) partition ID: This is a logical ID assigned to the data partition. There are multiple IDs, but the current LTFS format only uses a single data partition. Therefore, the partition ID is always unique.

(b) start block: This indicates the block number in which the beginning portion of the data constituting a file is located. The concept of blocks is used to indicate the location of data on a tape, and the size of each block is set to 512 KB by default.

(c) byte offset: The offset indicates where the starting position of the data is located in the block.

(d) byte count: This indicates the number of bytes constituting the data.

(e) file offset: This indicates where the data constituting the extent is located in the file.

When a file is written on tape in the LTFS format, a single extend is written in the index information to identify the entire file. In this way, the file can be efficiently read in one access. In the example shown in FIG. 3, the partition ID is not depicted for the sake of simplicity since there is only one, but the start position of the file X1 and the number of bytes L1 constituting the data are depicted by the start block and the byte offset respectively. As a result, the data area of File A can be represented as (X1, L1) in the index information.

FIG. 4 is a diagram showing a configuration example of the data partition after some of the File A has been edited (changed). In the example shown in FIG. 4, the data in the data area within the range of arrow A and surrounded by the dotted lines has been edited (changed). When data on tape is edited, it is difficult to overwrite the data previously written to the tape with the edited data. This is because data from another file written after this data may be overwritten. Therefore, the edited data is appended to the end of the previous data area in the data partition.

The index is also updated and appended to the end. In the example shown in FIG. 4, the data area specified by index information (X2, L2) is the appended edited data area. The index (index b) following this is the index of the appended edited data area. The appended index (index b) includes the information (X1, L1') (X2, L2) (X3, L3) as the extents of File A. In this information, there are three extents constituting File A representing the data in byte L1' with the leading data beginning from X1, data in byte L2 beginning from X2, and data in L3 beginning from X3. In the example shown in FIG. 4, editing (changes) has been performed only once. However, the extents are edited (appended, changed) using this operation every time a file is edited to specify the data areas constituting the file.

FIG. 5 is an image diagram of data reading (READ) in the configuration example shown in FIG. 4. When a command is issued by the file system to read File A, the locations of File A are determined from index b, which is the most recent index. First, the head 14 moves the start position X1 of the file. The data in byte L1' is then read (R1). Next, the head 14 is moved to X2 where data is located, and the head 14 reads the data in byte L2 (R2). Finally, the head 14 turns back and moves to X3 (rolling back twice), and reads data in byte L3 (R3). This series of head movements has to be performed each time File A is read unless File A is stored in the cache.

When the data in the data partition shown in FIG. 4 and FIG. 5 is backed up to another tape using the present invention, the data is backed up (copied) in the manner described below in order to eliminate or reduce the time required to move the head when reading data. The following is an explanation of the backup method in an embodiment of the present invention with reference to FIG. 6 through FIG. 9.

Figure 6:
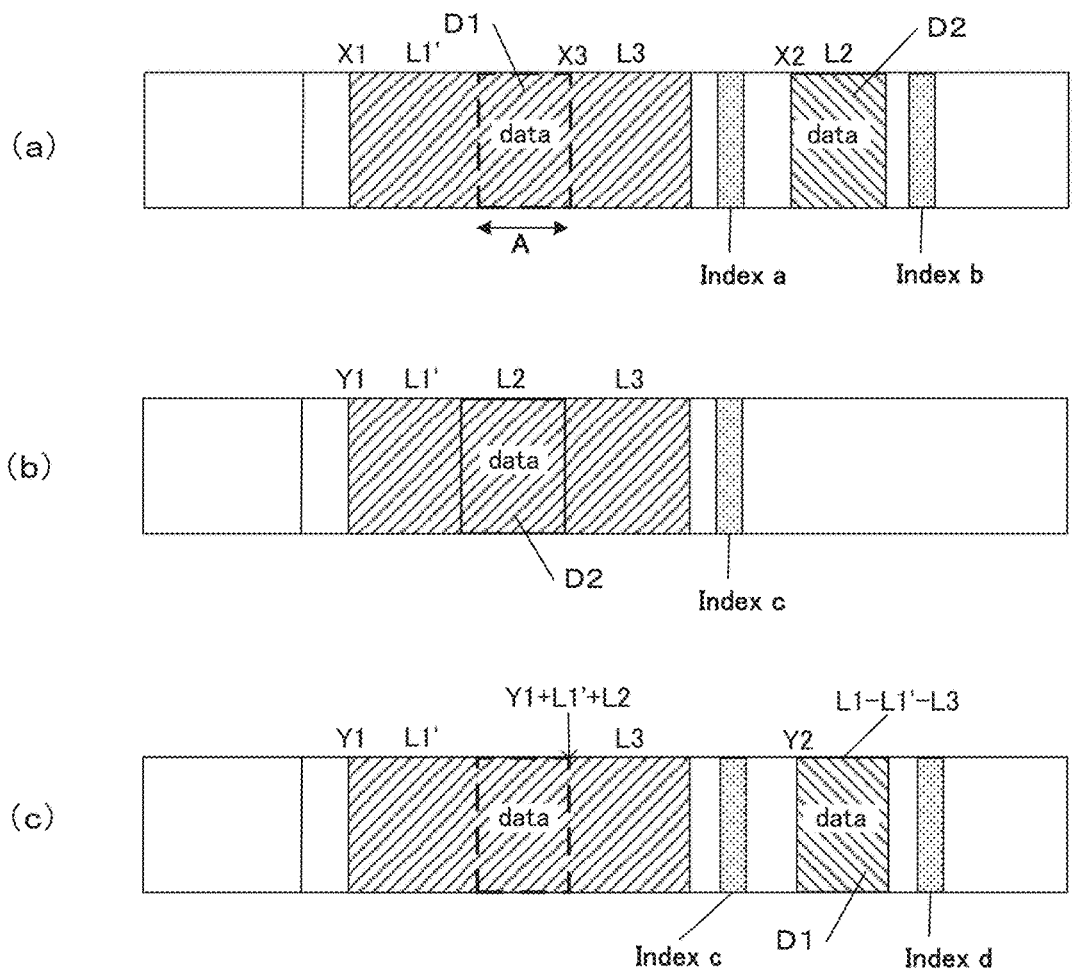
FIG. 6 is a diagram used to explain the backup method in a first embodiment of the present invention.

FIG. 6 is a diagram used to explain the backup method in a first embodiment of the present invention. FIG. 6(a) shows the configuration of the data partition when some of File A in FIG. 4 (range A) has been edited (changed). FIG. 6(b) and FIG. 6(c) show the configuration of the data partition after backup (copying). In FIG. 6(a), and as explained earlier with reference to FIG. 4, the appended index (index b) includes, as the extents of File A, (X1, L1') (X2, L2) (X3, L3) which specify three data areas.

Because some of the data (range A) in the original File A has been updated, the data in data areas "L1'+L2+L3" is created for the copy as shown in FIG. 6(b). The extents constituting index c at this time are (Y1, L1'+L2+L3). The start position Y1 is mapped to the start position in a free area for copying in the LTFS format. The copying of a file composed of data areas "L1'+L2+L3" begins with portion (X1, L1') of byte L1', followed by portion (X2, L2) in byte L2 (portion D2), and ending with portion (X3, L3) in byte L3 of the tape to be copied.

The previous generation of the file is reproduced next. This generation of the file on the tape to be copied includes the portion of byte L1' from Y1, the portion of byte "L1-L1'-L3" from Y2, and the portion of byte L3 from position "Y1+L1'+L2". These are linked, and correspond to data region (X1, L1) on the tape to be copied. This generation of the file is constituted as shown in FIG. 6(c). Here, "generation" refers to the sequence in the editing history (oldest-latest). The extents constituting index d in FIG. 6(c) are (Y1, L1') (Y2, L1−L1'−L3) (Y1+L1'+L2, L3).

In the example shown in FIG. 6, the edited portion A is in the central portion of the data area. The copying process can be performed following the same steps even when the edited portion A is somewhere closer to the beginning or the end of the data area. Here, "edited portion A" also includes situations in which data is appended to the area. When the copied file is read as shown in FIG. 6(b), the positions of the file are determined from index c, the head is moved to position Y1, and a file composed of contiguous data area ("L1'+L2+L3") can be read. Therefore, the file reading can be completed more quickly as clearly revealed in a comparison with the reading process explained with reference to FIG. 5. It should be clear from the configuration example in FIG. 6(c) that the editing history (generations) of the file can be retained for reproduction (reading) if necessary.

Figure 7:
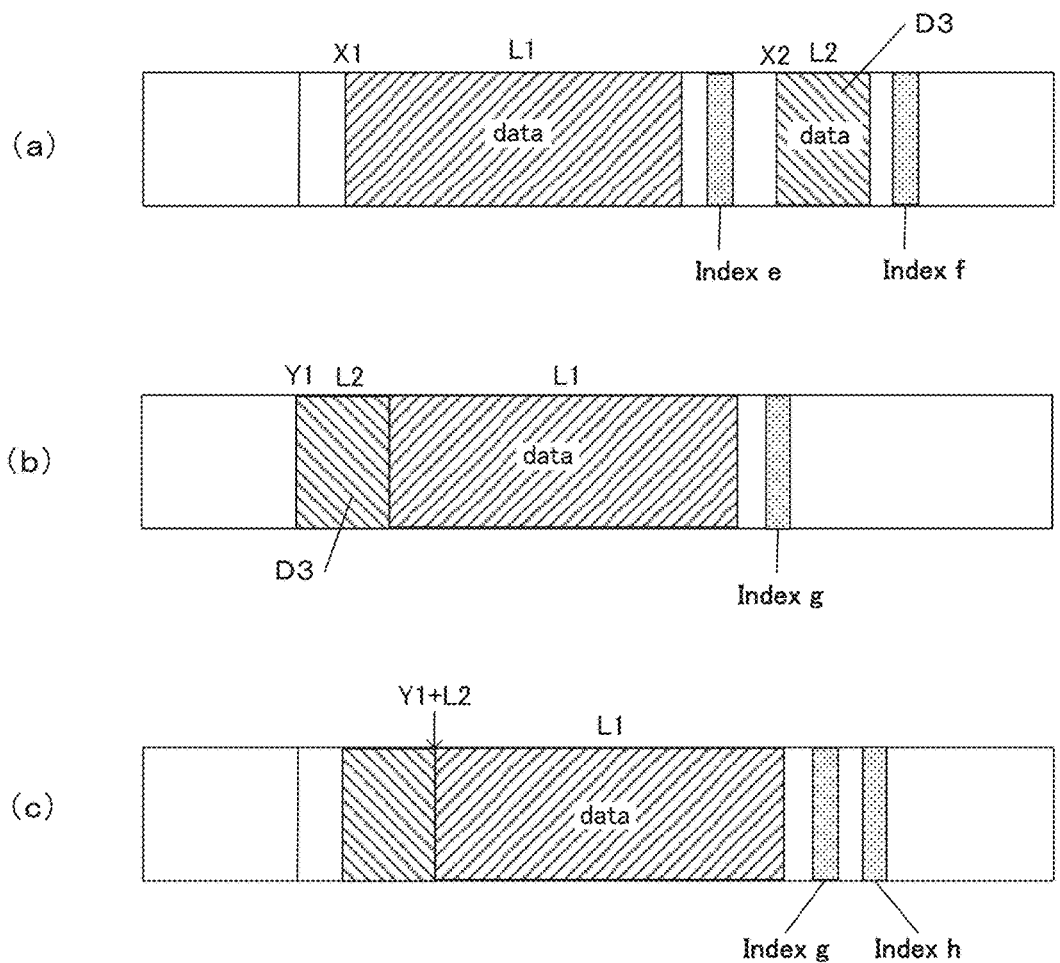
FIG. 7 is a diagram used to explain the backup method in a second embodiment of the present invention.

FIG. 7 is a diagram used to explain the backup method in a second embodiment of the present invention. FIG. 7(a) shows a situation in which edited data D3 has been inserted just before the data area specified by the extent (X1, L1) in index e. In this situation, the extents constituting index f are (X2, L2) (X1, L1). In this example, data area D3 is appended to the original File A. As shown in FIG. 7(b), data (a file) in data area "L1+L2" is created for copying. In this situation, the extent constituting index g is (Y1, L1+L2).

The start position Y1 is mapped to the start position in a free area for copying in the LTFS format. Byte L2 from the first half of data area "L1+L2" is copied from (X2, L2) on the tape to be copied, and byte L1 from the latter half is copied from (X1, L1) on the tape to be copied. The previous generation of the file is reproduced next. The portion of byte L1 from position Y1+L2 to be copied corresponds to data area (X1, L1) from the tape to be copied, and the previous generation of the file is constructed as shown in FIG. 7(c). In this situation, the extent constituting the index h is (Y1+L2, L1).

In the example shown in FIG. 7, the edited data was inserted (appended) just before the data area. However, the copying can be performed using the same steps even when the edited data is inserted (appended) just after the data area. Because the backup in FIG. 7, as in the case of FIG. 6, creates a contiguous data area, reading of the file can be completed more quickly. The editing history (generations) of the file can be retained and the file can be reproduced (read) if necessary.

Figure 8:
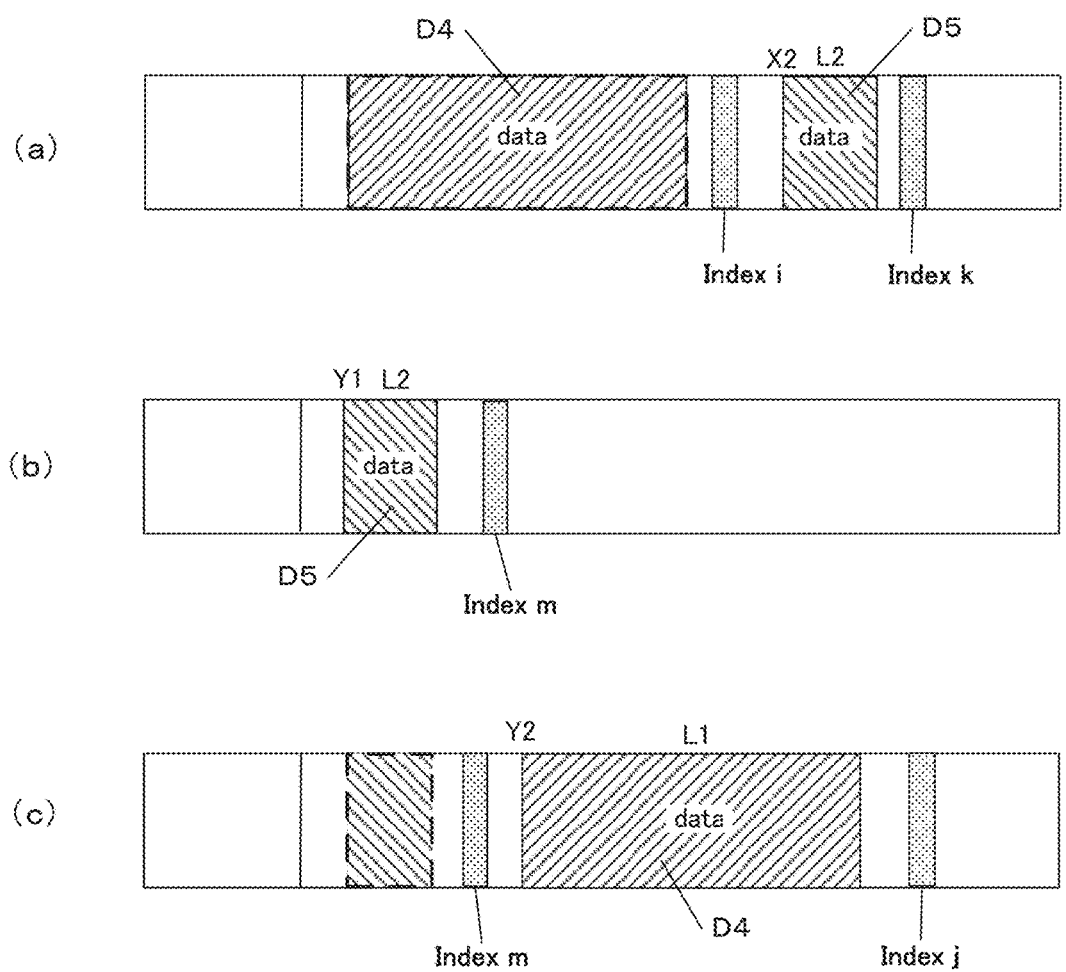
FIG. 8 is a diagram used to explain the backup method in a third embodiment of the present invention.

FIG. 8 is a diagram used to explain the backup method in a third embodiment of the present invention. In the situation shown in FIG. 8(a), the entire data area D4 constituting the entire original file is edited (changed), and data area D5 is formed after editing. In this situation, the extent constituting index k is (X2, L2). Because the entire file is replaced by new data in this example, the file (data area D5) is prepared for copying as shown in FIG. 8(b). In this situation, the extent constituting index m is (Y1, L2).

The start position Y1 is mapped to the start position in a free area for copying in the LTFS format. Byte L2 in data area D5 is copied from portion (X2, L2) of the original tape to create the file. The previous generation of the file is reproduced next. The portion of byte L1 (D4) to be copied from Y2 in the subsequent generation corresponds to (X1, L1) in data area D4 from the tape to be copied, and the previous generation of the file is constructed as shown in FIG. 8(c). In this situation, the extent constituting index j is (Y2, L1).

Because the backup in FIG. 8, as in the case of FIG. 6 and FIG. 7, creates a contiguous area afterwards, reading of the file can be completed more quickly. The editing history (generations) of the file can also be retained and the file can be reproduced (read) if necessary.

Although not shown in the drawings, no copying has to be performed when an original file has been deleted in its entirety. In order to reproduce the previous generation of the file, the data area in (X1, L1) of the copied tape is copied as a portion of byte L1 from Y1 in the subsequent generation. In this situation, the extent constituting the index is (Y1, L1).

FIG. 9 is an image diagram of the backup of data with multiple generations in the present invention.

FIG. 9(a) is an image of the backup of the third generation (three editing histories), and FIG. 9(b) is an image of the backup of three generations (three editing histories) of a file (data) using the backup (copying) method of the present invention. The generations are represented by gen#1 through gen#3, and a larger number corresponds to a newer generation (history) and vice versa. Therefore, the latest generation is gen#3. In both FIG. 9(a) and FIG. 9(b), the index (latest index) of the latest generation (gen#3) is written in the index partition.

As previously mentioned, the edited data is appended to the rear of the previous data areas in the data partition. The extent information in the corresponding index is updated at the same time. Therefore, the extent information in the index increases as new generations are updated. In this case, as shown in FIG. 9(a), it is possible to go back and trace the locations and content of the old indices from the content of the latest index along the flow indicated by arrows 1-3. As a result, the data can be read sequentially from the data areas specified in each index.

In the data partition after copying shown in FIG. 9(b), the data has been copied from the most recent generation to older generations of the copied data. Therefore, in a reversal of the situation shown in FIG. 9(a), the extent information in the index increases as the generations of the files become older. In this case, as shown in FIG. 9(b), it is possible to go forward and trace the locations and content of the old indices from the content of the latest index along the flow indicated by arrows 1-3. As a result, the data can be read sequentially from the data area specified in each index. When doing so, less time is required to move the head and less time is required to read data in the case of more recent generations of data which have smaller amounts of extent information in the index.

When users read a file stored on tape, they most frequently access the most recently edited generation of the file. The need to roll back and access previously edited generations of files is fairly rare. However, given the nature of the conventional LTFS format, it requires more time to read the latest generation of a file, which is the generation most frequently accessed, than previous generations of the file. However, when backed up using the method of the present invention as illustrated in FIG. 9(b), the time required to read the latest (most recent) generation of a file, which is the most frequently accessed generation of the file, can be reduced.

Embodiments of the present invention were described above with reference to the drawings. However, the present invention is by no means restricted to the embodiments described above. Various improvements, modifications and changes are possible without departing from the spirit and scope of the present invention.

REFERENCE SIGNS LIST

10: Tape drive
11: Host I/F
12: Buffer
13: Channel
14: Head
15: Motor
16: Controller
17: Head position control system
18: Motor driver
19: Cartridge memory I/F
20: Tape cartridge
21, 22: Reels
23: Tape
24: Cartridge memory (CM)
30: Server (host)
32, 34: PCs
36: Network
40: Servo band
100: File system

The invention claimed is:

1. A method for backing up data on a tape in a file system, the data being stored on the tape as a single file including a first data area and a second data area separate from the first data area, the data in the second data area corresponding to data in a third data area, which is a changed portion of the data in the first data area, and each data area being managed using index information including the start positions of data on the tape and length information, the method comprising:
   copying the data area in the first data area, excluding the third data area, as well as in the second data area to the tape as a single, contiguous fourth area;
   copying the second data area to a position corresponding to replacement of the third data area;
   storing index information for identifying the fourth data area to the tape;
   copying the third data area to the tape as a fifth data area separate from the fourth data area; and
   storing on the tape the index information for identifying the data area in the fourth data area excluding the second data area, and the index information for identifying the fifth data area.

2. The method according to claim 1, wherein the third data area is a data area positioned in either a beginning portion, a middle portion or an end portion of the first data area.

3. The method according to claim 1, wherein each of the data areas and each element of the index information is stored on a data partition of the tape, and each of the index information elements is arranged immediately following the corresponding data area.

4. A method for backing up data on a tape in a file system, the data being stored on the tape as a single file including a first data area and a second data area separate from the first data area, the data in the second data area corresponding to data appended to the first data area, and each data area being managed using index information including the start positions of data on the tape and length information, the method comprising:
  copying the first data area and the second data area to the tape as a continuous third data area;
  storing, on the tape, index information for identifying the third data area; and
  storing, on the tape, index information for identifying the data area in the third data area excluding the second data area.

5. The method according to claim 4, wherein the data area appended to the first data area is a data area appended to either a beginning portion or an end portion of the first data area.

6. The method according to claim 4, wherein each of the data areas and each element of the index information is stored on a data partition of the tape, and each of the index information elements is arranged immediately following the corresponding data area.

7. A method for backing up data on a tape in a file system, the data being stored on the tape as a single file including a first data area and a second data area separate from the first data area, the data in the second data area corresponding to the data in the first data area changed in its entirety, and each data area being managed using index information including the start positions of data on the tape and length information, the method comprising:
  copying the second data area on the tape as a third data area;
  storing, on the tape, index information for identifying the third data area;
  copying the first data area to the tape as a fourth data area separate from the third data area; and
  storing, on the tape, index information for identifying the fourth data area.

8. The method according to claim 7, wherein each of the data areas and each element of the index information is stored on a data partition of the tape, and each of the index information elements is arranged immediately following the corresponding data area.

9. A system for backing up data on a tape, the data being stored on the tape as a single file including a first data area and a second data area separate from the first data area, the data in the second data area corresponding to data in a third data area, which is a changed portion of the data in the first data area, and each data area being managed using index information including the start positions of data on the tape and length information, the system comprising:
  a head configured to write data to a tape; and
  a hardware controller coupled to the head, the controller being configured to perform the method of claim 1.

10. The system according to claim 9, wherein the third data area is a data area positioned in either a beginning portion, a middle portion or an end portion of the first data area.

11. The system according to claim 9, wherein each of the data areas and each element of the index information is stored on a data partition of the tape, and each of the index information elements is arranged immediately following the corresponding data area.

12. A system for backing up data on a tape, the data being stored on the tape as a single file including a first data area and a second data area separate from the first data area, the data in the second data area corresponding to data in a third data area, which is a changed portion of the data in the first data area, and each data area being managed using index information including the start positions of data on the tape and length information, the system comprising:
  a head configured to write data to a tape; and
  a hardware controller coupled to the head, the controller being configured to perform the method of claim 4.

13. The system according to claim 12, wherein the data area appended to the first data area is a data area appended to either a beginning portion or an end portion of the first data area.

14. The system according to claim 12, wherein each of the data areas and each element of the index information is stored on a data partition of the tape, and each of the index information elements is arranged immediately following the corresponding data area.

15. A system for backing up data on a tape, the data being stored on the tape as a single file including a first data area and a second data area separate from the first data area, the data in the second data area corresponding to data in a third data area, which is a changed portion of the data in the first data area, and each data area being managed using index information including the start positions of data on the tape and length information, the system comprising:
  a head configured to write data to a tape; and
  a hardware controller coupled to the head, the controller being configured to perform the method of claim 7.

16. The system according to claim 15, wherein each of the data areas and each element of the index information is stored on a data partition of the tape, and each of the index information elements is arranged immediately following the corresponding data area.

* * * * *